US008805986B2

(12) United States Patent
Driesen et al.

(10) Patent No.: US 8,805,986 B2
(45) Date of Patent: Aug. 12, 2014

(54) APPLICATION SCOPE ADJUSTMENT BASED ON RESOURCE CONSUMPTION

(75) Inventors: Volker Driesen, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 307 days.

(21) Appl. No.: 13/285,396

(22) Filed: Oct. 31, 2011

(65) Prior Publication Data

US 2013/0111010 A1 May 2, 2013

(51) Int. Cl.
G06F 15/173 (2006.01)
G06F 9/46 (2006.01)
H04L 12/64 (2006.01)
G06F 9/50 (2006.01)

(52) U.S. Cl.
CPC .... *H04L 12/6418* (2013.01); *G06F 2209/5018* (2013.01); *G06F 9/505* (2013.01)
USPC ............................ 709/223; 709/226; 718/105

(58) Field of Classification Search
None
See application file for complete search history.

(56) References Cited

U.S. PATENT DOCUMENTS

| | | | |
|---|---|---|---|
| 2008/0250099 A1* | 10/2008 | Shen et al. | 709/203 |
| 2012/0089664 A1* | 4/2012 | Igelka | 709/203 |
| 2012/0173709 A1* | 7/2012 | Li et al. | 709/224 |
| 2012/0254822 A1* | 10/2012 | Lin et al. | 717/101 |

* cited by examiner

*Primary Examiner* — Ranodhi Serrao

(57) ABSTRACT

Various embodiments of systems and methods for application scope adjustment based on resource consumption are described herein. A load parameter of a data center is measured. A request is received at the data center. An implementation variant to process the request is selected based on the measured load parameter and a threshold value of the load parameter. The implementation variant comprises a standard process for processing the received request and an alternative process for processing the received request that reduces the impact on the load parameter compared to the standard process. The received request is processed using the selected implementation variant.

21 Claims, 6 Drawing Sheets

APPLICATION SCOPE ADJUSTMENT BASED ON RESOURCE CONSUMPTION

FIELD

The field relates generally to management of computational resources. More particularly, the field relates to management of resource usage by adjusting scope of applications.

BACKGROUND

Data centers support activities related to on-demand or online applications that require analyses of data. A data center typically includes computer hardware such as memory, hard drives, and networking hardware, and a cooling system. Data centers are designed considering various factors such as amount of data to be handled, expected network traffic, etc. When requests are received at the data center via a network, they are processed and results or outputs are transmitted to the requestor. The processing of the requests consumes computing resources at the data center and, in turn, affects the operation of the cooling system.

Data centers are typically not designed to manage peak usage at all times. A peak usage is a scenario where the computing hardware operates at maximum capacity. The cooling system may not handle peak usage for extended periods of time. The cooling system is typically designed for average consumption of computing resources that is below the peak usage. At peak usage, the data center may not be able to handle any more requests. Therefore, any new requests may be delayed or rejected. The capacity of data centers may be increased to handle more requests, but that leads to additional costs. Also, since peak usage scenarios may exist only for short durations, increasing the capacity of data centers is not an efficient and cost-effective option. But rejection of requests results in outage of services that are promised to customers. Random customers are affected by rejection of requests, leading to decrease in customer satisfaction, service level, or credibility of a service.

It would therefore be desirable to efficiently manage requests to deal with peak usage scenarios.

SUMMARY

Various embodiments of systems and methods for application scope adjustment based on resource consumption are described herein. A load parameter of a data center is measured. A request is received at the data center. An implementation variant to process the request is selected based on the measured load parameter and a threshold value of the load parameter. The implementation variant comprises a standard process for processing the received request and an alternative process for processing the received request that reduces the impact on the load parameter compared to the standard process. The received request is processed using the selected implementation variant These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for application scope adjustment based on resource consumption are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
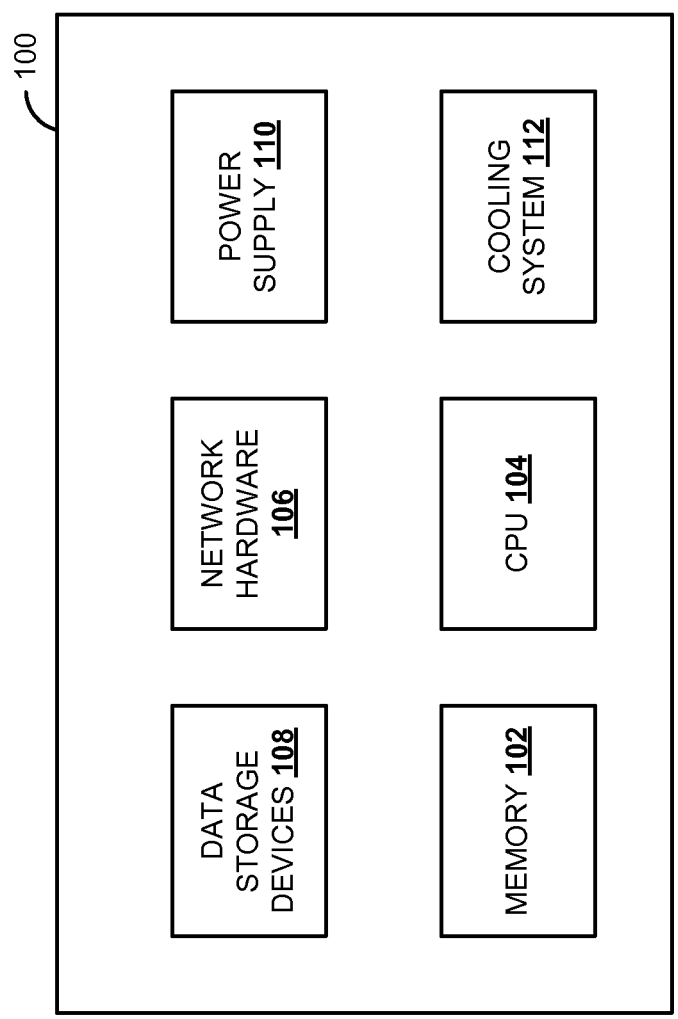
FIG. 1 is a block diagram of components of a data center, as an example.

FIG. 1 illustrates main components of a data center 100. The data center 100 includes computing hardware such as a memory 102, a central processing unit (CPU) or a processor 104, network hardware 106, and hard drives 108 or other data storage devices. The memory 102 is a random access memory (RAM). The computing hardware can be part of a server. The processor 104 reads instructions from the memory 102 and performs actions as per the instructions. Network hardware 106 provides connection to one or more networks such as, for example, the Internet, Local Area Network (LAN), or wireless network. The requests from clients are received via a network. Once a request is received, the request is processed based on instructions and a response is sent to the client. Data stored in the hard drives 108 is used for processing requests. The data center 100 also includes a power supply 110 including backup power systems and a cooling system 112. The cooling system 112 can include an air conditioning system that is designed to maintain a prescribed temperature.

Figure 2:
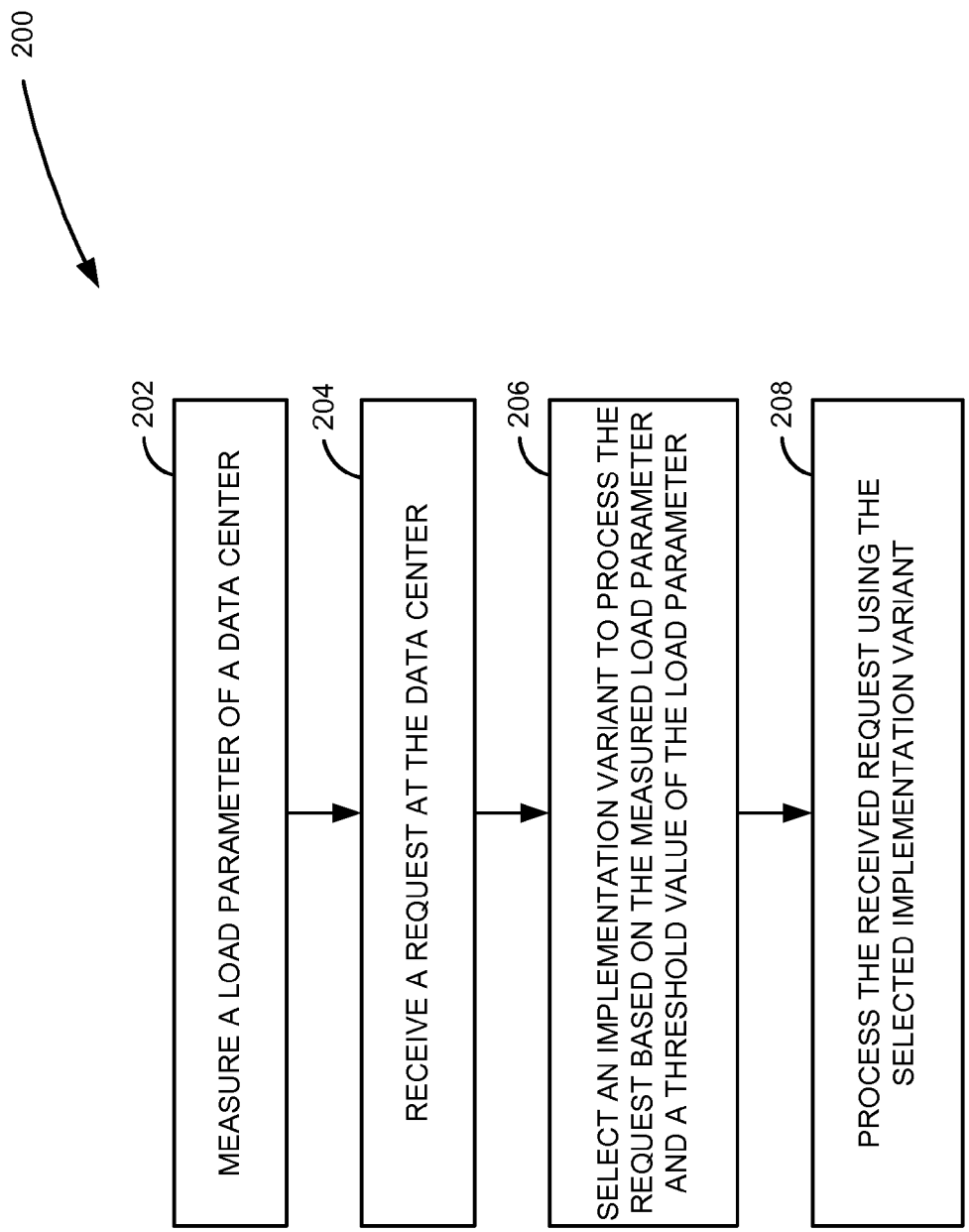
FIG. 2 is a block diagram of a method for adjusting application scope based on resource usage, according to one embodiment.

FIG. 2 illustrates an embodiment of a method 200 for adjusting application scope based on resource usage. At 202, a load parameter of a data center is measured. A data center includes a plurality of load parameters. The load parameters include usage information of various components of the data center that are indicative of the load on the data center. Cooling system of a data center needs to be adjusted to deal with the fluctuations of the load on the data center. The load parameters can include processor usage, memory usage, network bandwidth capacity, and input/output usage. The value of the load parameters vary depending on the number of requests received at the data center and the computing resources required to process the requests. There may be a threshold value for these load parameters, above which the data center may not operate for extended periods of time. As an example, the value of the processor usage can be the number of processor or CPU cycles. The memory usage can include the value of the memory that is in use, which can be in megabytes, gigabytes, etc. Network bandwidth capacity can include bit rate of the network hardware or the bit rate supported by the client device. Input/output refers to transfer of information from or to CPU/memory. The amount of this information can be the value of the input/output load parameter.

At 204, a request is received at the data center from a client. The request needs to be processed and a response is required to be sent to the client. The processing of the request requires consumption of one or more computing resources and thereby affects one or more load parameters. At 206, an implementation variant to process the received request is selected based on the measured load parameters and a threshold value of the load parameters. The implementation variant includes a standard process that would be typically used to process the request and an alternative process that can be used to process the request. A standard process uses primary data for processing the request. Primary data can be the data that is stored in the hard drives. An alternative process is designed to process the request using lesser resources compared to the standard process. Alternative processes will therefore reduce the impact on load of the data center compared to the standard process. These alternative processes can be designed for the requests. A variety of techniques can be used for developing the alternative processes. For example, the alternative processes can be designed to process the requests with less data or lesser fields of data than required by the standard process. Secondary data that constitutes a portion of the primary data can be used for the alternative process. The alternative processes can be designed to process the requests using past data or any extracts of data that can satisfy the client's expectations for the time being. The request is then processed with selected implementation variant at 208 and a response is sent to the client.

In one embodiment, the values of the measured load parameter and the threshold parameter determine which implementation variant is selected. If the threshold load parameter is 'X' and the measured load parameter is 'Y' which is greater than 'X,' then the alternative implementation variant is selected. If the threshold load parameter is 'X' and the measured load parameter is 'Z' which is less than 'X,' then the standard implementation variant is selected. For example, if threshold load parameter is a CPU load of 70% and the measured CPU load is 80%, then the alternative process is selected. In another embodiment, the resources required to process the received request, the measured load parameters, and the threshold values of the load parameters are considered in the selection of the implementation variant.

Consider an example in which a request requires to run real-time analytics on sales data. A request is received when a user performs an action using an application, e.g., an analytics application. An application can be accessed using a variety of devices such as computers, laptops, tablets, or mobile phones. Real-time analytic operations are generally performed on the latest data. The response expected by a user is an analysis of sales data. The standard process runs analytic operations on the latest data that is stored in the data storage devices in the data center. There can be millions of sales records, requiring a considerable memory for processing them. Consider that the measured memory usage load parameter is 700 megabytes, the threshold memory usage is 800 megabytes, and the memory required to process the millions of sales records is 300 megabytes. Since the sum (300 MB+700 MB) of the memory required to process the request and the measured load parameter is greater than the threshold load parameter (800 MB), the alternative process is selected. The standard process is selected if the sum of the memory required to process the request and the measured load parameter is less than the threshold load parameter (800 MB). Instead of using the entire sales data, the alternative process can use a latest aggregation of the sales data (e.g., sales volume aggregation) that is previously performed and stored. Depending on the type of the sales system, aggregations may be performed few times a day and the latest aggregation may be representative of sales data that may be few hours old. The alternative process processes the request using this latest aggregation. A response including an analysis of sales data is then sent to the client.

In one embodiment, two similar requests can be processed differently, i.e., one with the standard process and the other with the alternative process. Consider another example in which the memory required to process the sales records according to a first request from a customer is 190 MB, the measured memory usage load parameter is 600 megabytes, and the threshold memory usage is 800 MB. Since the sum (190 MB+600 MB) of the memory required to process the first request and the measured load parameter is less than the threshold load parameter (800 MB), the standard process is selected. While processing the first request, if a second request (requiring around 200 MB) to process the same or similar sales records is received, then the alternative process is selected because the sum of the memory required (200 MB) to process the second request and the measured load parameter (which is now 600 MB+around 190 MB) is greater than the threshold load parameter (800 MB).

In the context of other load parameters, if the standard process requires 100 million CPU cycles to process sales data, the alternative process requiring much less CPU cycles such as one million or less CPU cycles can be used based on measured and threshold number of CPU cycles. In the context of network bandwidth load parameter, if the bandwidth of the data center is at the maximum and the bandwidth required to send a response of analytic results is not available, then an alternative process of sending only an image of the analytic results can be used. Alternative processes consume lesser resources compared to standard processes and therefore reduce the impact on the load on the data center.

As another example, consider a procurement scenario in which a customer wants to know delivery data such as shipment duration of a product. A web-based product catalog can be used in such situations. When delivery data of a product is to be provided, various product-related data such as the availability of product, stages of production of the product, available transportation facilities, quantity in stock, etc that is stored in a data storage device needs to be analyzed. This is the standard process and can consume significant resources. Instead, an alternative process that uses secondary information such as statistical information derived from past data can be used to provide delivery data. Average shipment duration for that product over a period of time (e.g., six months, a year, etc) can be directly provided without any computationally expensive calculation. This average shipment duration can provide a reasonable picture to the customer.

As another example, for any request requiring searching in several fields, an alternative process can be designed to selectively search in lesser number of fields. For example, to search a calendar event, a standard process searches in all the relevant fields such as title or subject, speaker, location, tags, topic, and material related to the event. An alternative process can be designed to search only few of those fields, thereby reducing the amount of data on which the search has to be performed. Similarly, in searching for books in a web-based book catalog, an alternative process can be designed to search only few fields such as title or short notes instead of searching the entire contents of the books.

In one embodiment, there can be more than one alternative process to process a request. A first alternative process may affect a first load parameter (e.g., input/output) and a second alternative process may affect a second load parameter (e.g., Memory). Depending on the estimated impact on the first and second load parameters to process a request, either the first alternative process or the second alternative process can be used. In another embodiment, if the measured second load parameter is relatively lower than the measured first load parameter, then the second alternative process can be used to process a request.

Figure 3:
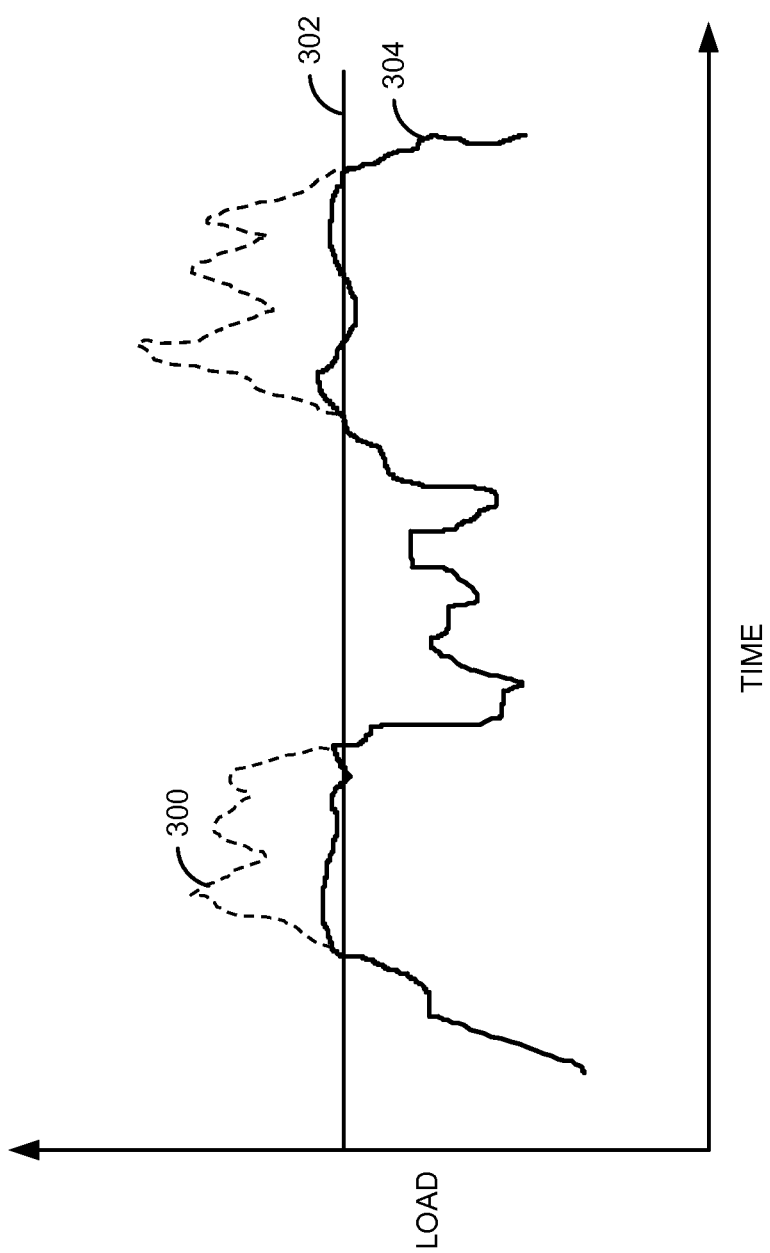
FIG. 3 illustrates load management over a period of time, according to one embodiment.

Referring to FIG. 3, if the standard processes are used to process all the requests, the load on the data center may exceed a threshold or acceptable load level. Eventually, this will give rise to peak load situation 300 that can exist for extended periods, as shown by the dotted lines in FIG. 3. The load on the data center exceeds a threshold load parameter 302 during the peak load situations 300. The cooling system and other hardware may not be able to handle such peak load situations 300. This can lead to possible damage of components or shutdown of the data center. Using alternative process reduces the load on the data center. A load profile 304 that can be safely managed by the data system hardware can be achieved by the application scope adjustment method as described above. The scope of applications is adjusted using the standard process or the alternative process based on the load on the data center.

Figure 4:
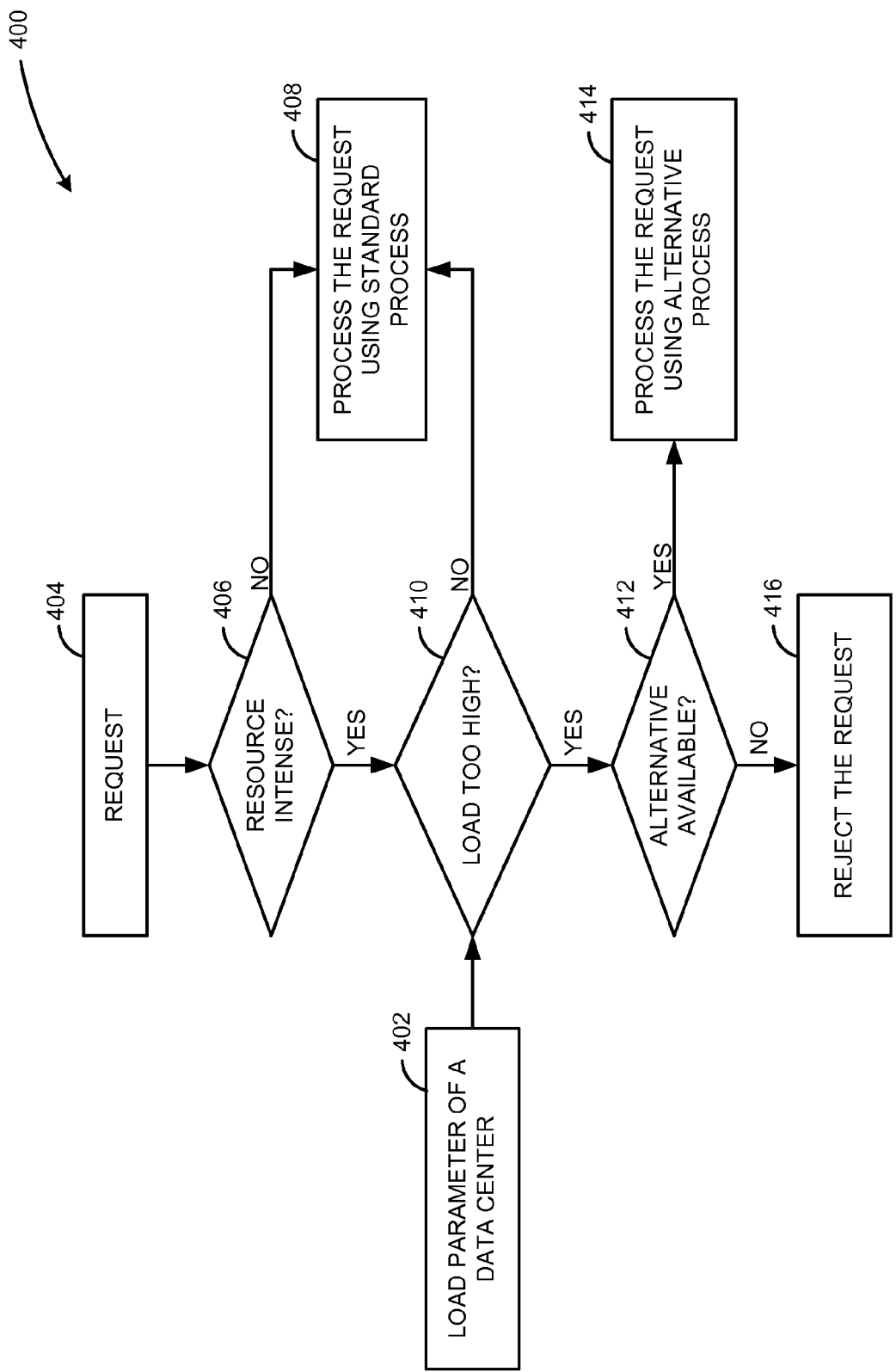
FIG. 4 is a flow diagram of the method for adjusting application scope, according to one embodiment.

FIG. 4 illustrates a flow diagram 400 of an embodiment of the method for adjusting application scope. One or more load parameters of the data center are continuously measured at 402. Once a request 404 is received, a determination is made at 406 about the resources required to process the request. Some requests do not require complex analysis of data and consume significantly less resources. If the request 404 requires a simple response without any complex analysis of data, then the request 404 is processed using the standard process at 408. For example, if a request requires less than 10 CPU cycles or 10 kilobytes of memory of processing power, then the standard process is used to process the request and a response is sent to the client. If the request 404 is resource intensive, then the load on the data center is considered at 410. An appropriate implementation variant is then selected. If the load on the data center is not high, then the request is processed using the standard process at 408. The determination of whether the load is high or not is based on current measured load parameter and a threshold load parameter, as described previously. If the load is high, then an alternative process should be used to process the request. However, all requests may not have alternative processes. A determination of whether an alternative process is available or not for a particular request is made at 412. If the request has an alternative process associated with it, then the request is processed with the alternative process at 414. If the request does not have any associated alternative process, then the request is rejected at 416.

Therefore, instead of randomly rejecting requests when the load on the data center is high, the application scope adjustment method follows a structured approach in determining which requests can be rejected, which requests can be processed using standard processes, and which requests can be processed using alternative processes. Using such approach leads to lesser number of rejections. This will increase credibility of services and customer satisfaction.

Figure 5:
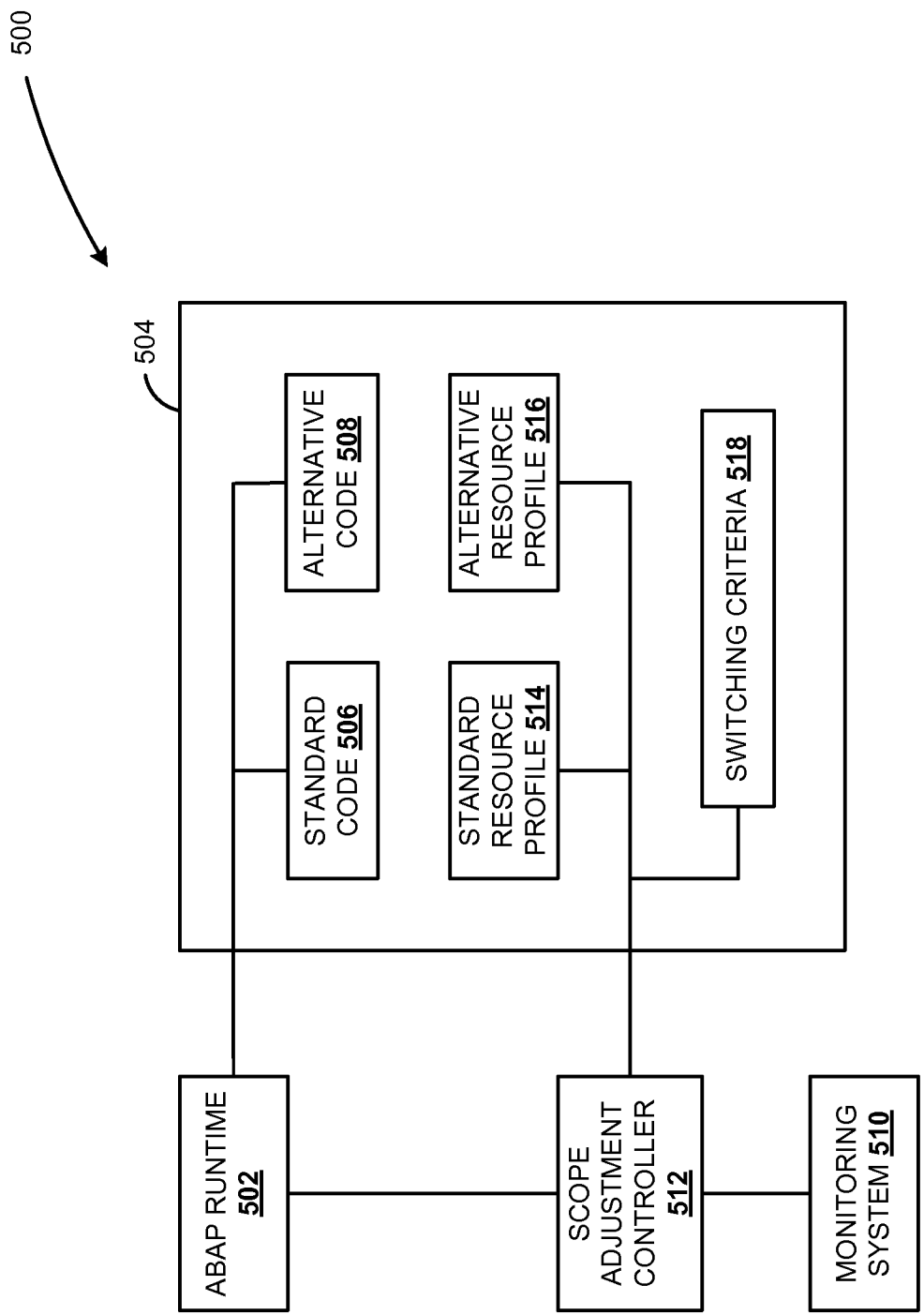
FIG. 5 is a block diagram of a system for adjusting application scope based on resource usage, according to one embodiment.

FIG. 5 is a block diagram of an embodiment of a system 500 for adjusting application scope based on resource usage. The system 500 is an Advanced Business Application Programming (ABAP) based system. The ABAP runtime 502 is a processor of the requests that are received from users. There may be a plurality of application software components deployed by the ABAP runtime 502. Based on the request, the ABAP runtime 502 loads and executes an appropriate application component 504 in order to fulfill the request. The application software component 504 includes a standard code 506 and an alternative code 508. The standard code 506 includes instructions to process the request based on the standard process. The alternative code 508 includes instructions to process the request based on the alternative process. The ABAP runtime 502 will load and execute either the standard code 506 or the alternative code 508 depending on the load on the data center. A monitoring system 510 provides resource usage data or performance data including load parameters such as CPU load, memory usage, input/output, network bandwidth, etc.

A scope adjustment controller 512 determines which implementation variant needs to be selected based on the load parameters provided by the monitoring system 510 and threshold values of the load parameters. The scope adjustment controller 512 is a generic component that can be used in combination with any application software component. The ABAP runtime 502 invokes the scope adjustment controller 512. The scope adjustment controller 512 reads metadata associated with the implementation variants, i.e. standard and alternative variants. This metadata can be referred as "profiles." The profiles include a standard resource profile 514 for the standard code 506 and an alternative resource profile 516 for the alternative code 508. A profile can refer to one or more switching criteria 518. The switching criteria 518 refer to one or more load parameters or criteria that affect the load parameters. For example, a switch criterion as referred by the standard profile 514 can be "CPU load less than 70%" and a switch criterion as referred by the alternative profile 516 can be "CPU load greater than or equal to 70%." The scope adjustment controller 512 retrieves the measured CPU load from the monitoring system 510. If the CPU load, for example, is 75%, then the scope adjustment controller 512 decides to run the alternative variant. The ABAP runtime 502 then loads and executes the alternative code 508. Although the above system description is based on ABAP, similar approach can be applied using other computer languages.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
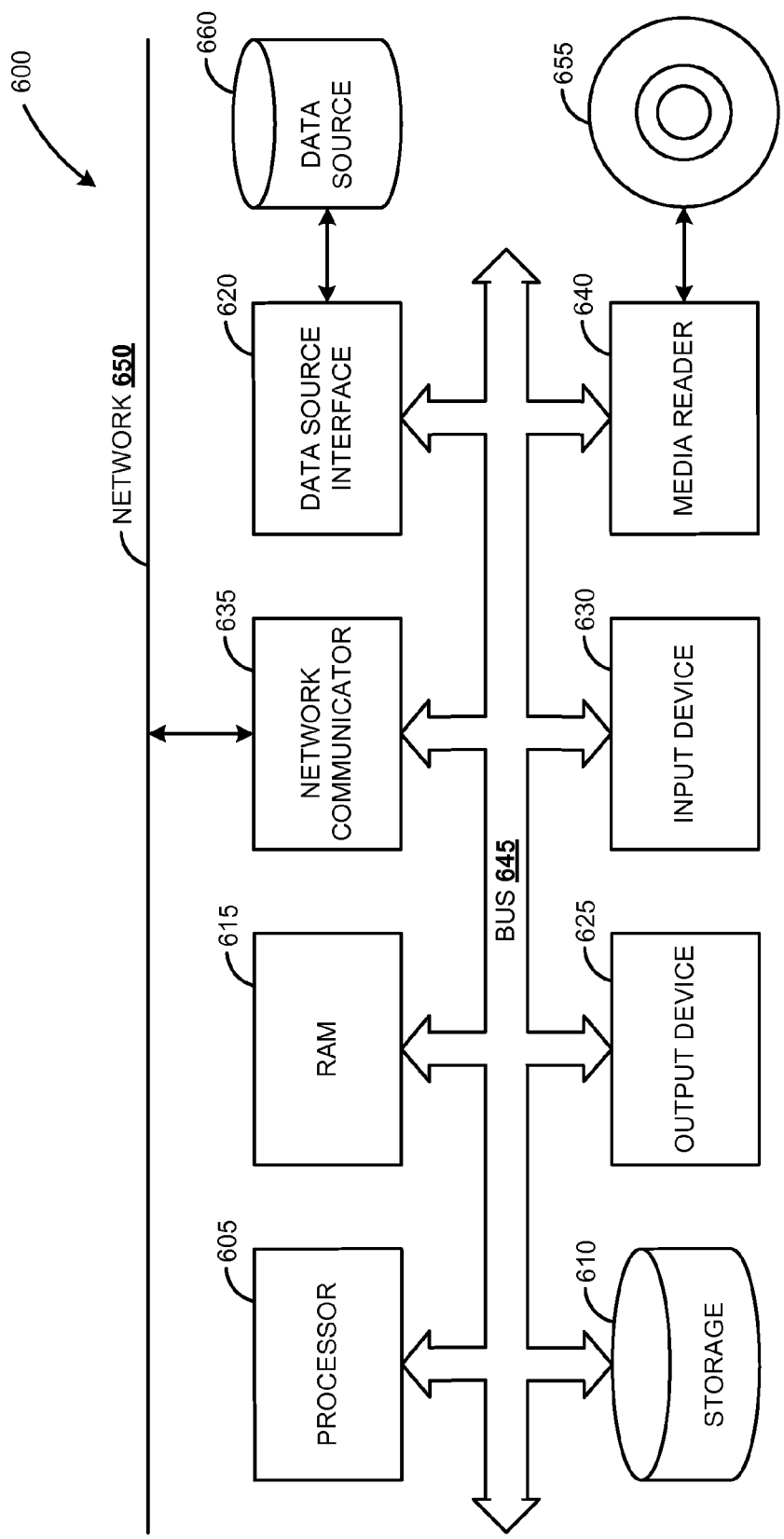
FIG. 6 is a block diagram of an exemplary computer system according to one embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660.

The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:

measure a load parameter of a data center;
receive a request at the data center;
select an implementation variant to process the request based on the measured load parameter and a threshold value of the load parameter, wherein the implementation variant comprises a standard process for processing the received request and an alternative process for processing the received request that reduces the impact on the load parameter compared to the standard process, wherein the standard process uses primary data for processing the request and the alternative process uses secondary data including derived data and a portion of the primary data; and process the received request using the selected implementation variant;

wherein the standard process is selected when the measured load parameter is below the threshold load parameter and the alternative process is selected when the measured load parameter is above the threshold load parameter.

2. The article of manufacture of claim 1, wherein the load parameter comprises at least one of processor usage, memory usage, network bandwidth, and input/output usage.

3. The article of manufacture of claim 1, wherein the instructions to select the alternative process, comprises instructions, which when executed by a computer, cause the computer to:

when there are a plurality of alternative processes, select one of the plurality of alternative processes with a relatively lower measured load parameter.

4. The article of manufacture of claim 1, wherein the instructions to select the implementation variant further comprises instructions, which when executed by a computer, cause the computer to:

select the implementation variant to process the request based on resources required to process the received request, the measured load parameter, and the threshold value of the load parameter.

5. The article of manufacture of claim 4, wherein the instructions to select the implementation variant, comprises instructions, which when executed by a computer, cause the computer to:

select the alternative process when the sum of the resources required to process the request and the measured load parameter is greater than or equal to the threshold load parameter.

6. The article of manufacture of claim 4, wherein the instructions to select the implementation variant, comprises instructions, which when executed by a computer, cause the computer to:

select the standard process when the sum of the resources required to process the request and the measured load parameter is less than the threshold load parameter.

7. The article of manufacture of claim 4, wherein the implementation variant further comprises request-rejection variant and the instructions to select the implementation variant, comprises instructions, which when executed by a computer, cause the computer to:

select the request-rejection variant when there is no alternative process for a particular request.

8. A computer-implemented method for adjusting application scope based on resource usage, the method comprising:

measuring a load parameter of a data center;

receiving a request at the data center;

selecting an implementation variant to process the request based on the measured load parameter and a threshold value of the load parameter, wherein the implementation variant comprises a standard process for processing the received request and an alternative process for processing the received request that reduces the impact on the load parameter compared to the standard process, wherein the standard process uses primary data for processing the request and the alternative process uses secondary data including derived data and a portion of the primary data; and processing the received request using the selected implementation variant;

wherein the standard process is selected when the measured load parameter is below the threshold load parameter and the alternative process is selected when the measured load parameter is above the threshold load parameter.

9. The method of claim 8, wherein the load parameter comprises at least one of processor usage, memory usage, network bandwidth, and input/output usage.

10. The method of claim 8, wherein selecting the alternative process, comprises:

when there are a plurality of alternative processes and load parameters, selecting one of the plurality of alternative processes with a relatively lower measured load parameter.

11. The method of claim 8, wherein selecting the implementation variant further comprises:

selecting the implementation variant to process the request based on resources required to process the received request, the measured load parameter, and the threshold value of the load parameter.

12. The method of claim 11, wherein selecting the implementation variant comprises:

selecting the alternative process when the sum of the resources required to process the request and the measured load parameter is greater than or equal to the threshold load parameter.

13. The method of claim 11, wherein selecting the implementation variant comprises:

selecting the standard process when the sum of the resources required to process the request and the measured load parameter is less than the threshold load parameter.

14. The method of claim 11, wherein the implementation variant further comprises request-rejection variant and selecting the implementation variant, comprises:

selecting the request-rejection variant when there is no alternative process for a particular request.

15. A computer system for adjusting application scope based on resource usage, comprising:

a computer memory to store program code; and a processor to execute the program code to:

measure a load parameter of a data center;

receive a request at the data center;

select an implementation variant to process the request based on the measured load parameter and a threshold value of the load parameter, wherein the implementation variant comprises a standard process for processing the received request and an alternative process for processing the received request that reduces the impact on the load parameter compared to the standard process, wherein the standard process uses primary data for processing the request and the alternative process uses secondary data including derived data and a portion of the primary data; and process the received request using the selected implementation variant;

wherein the standard process is selected when the measured load parameter is below the threshold load parameter and the alternative process is selected when the measured load parameter is above the threshold load parameter.

16. The system of claim 15, wherein the load parameter comprises at least one of processor usage, memory usage, network bandwidth, and input/output usage.

17. The system of claim 15, wherein the program code to select the alternative process, comprises program code to:
when there are a plurality of alternative processes, select one of the plurality of alternative processes with a relatively lower measured load parameter.

18. The system of claim 15, wherein the program code to select the implementation variant, further comprises program code to:
select the implementation variant to process the request based on resources required to process the received request, the measured load parameter, and the threshold value of the load parameter.

19. The system of claim 18, wherein the program code to select the implementation variant, further comprises program code to:
select the alternative process when the sum of the resources required to process the request and the measured load parameter is greater than or equal to the threshold load parameter.

20. The system of claim 18, wherein the program code to select the implementation variant, further comprises program code to:
select the standard process when the sum of the resources required to process the request and the measured load parameter is less than the threshold load parameter.

21. The system of claim 18, wherein the implementation variant further comprises request-rejection variant and the program code to select the implementation variant, comprises program code to:
select the request-rejection variant when there is no alternative process for a particular request.

* * * * *